(12) United States Patent
Paul

(10) Patent No.: US 10,602,237 B1
(45) Date of Patent: Mar. 24, 2020

(54) EPHEMERAL DIGITAL STORY CHANNELS

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/215,065

(22) Filed: Dec. 10, 2018

(51) Int. Cl.
*H04N 21/81* (2011.01)
*G06Q 50/00* (2012.01)
*H04N 21/43* (2011.01)

(52) U.S. Cl.
CPC ......... *H04N 21/8133* (2013.01); *G06Q 50/01* (2013.01); *H04N 21/4307* (2013.01)

(58) Field of Classification Search
CPC ........... H04N 21/8133; H04N 21/4307; H04N 21/258; H04N 21/25841; H04N 21/2668; H04N 21/2665; H04N 21/458; H04N 21/454; H04N 21/4788; G06Q 50/01
See application file for complete search history.

(56) References Cited

U.S. PATENT DOCUMENTS

| | | | | |
|---|---|---|---|---|
| 2010/0094627 | A1* | 4/2010 | Katpelly | G11B 27/105 704/235 |
| 2013/0325978 | A1* | 12/2013 | Mansfield | G06Q 50/01 709/206 |
| 2014/0067945 | A1* | 3/2014 | Archibong | H04N 21/44222 709/204 |
| 2014/0229552 | A1* | 8/2014 | Ranganath | H04L 51/32 709/206 |
| 2014/0372898 | A1* | 12/2014 | Ayres | G06Q 10/1093 715/744 |
| 2015/0331842 | A1* | 11/2015 | Costa | H04L 29/08 715/202 |
| 2017/0102862 | A1* | 4/2017 | Marra | G06F 16/9535 |
| 2019/0349328 | A1* | 11/2019 | Harkreader | G06Q 50/01 |

* cited by examiner

*Primary Examiner* — Alexander Gee
(74) *Attorney, Agent, or Firm* — FisherBroyles, LLP

(57) ABSTRACT

Systems and methods for an ephemeral digital story channel may include (1) maintaining a primary story channel for a user of a social networking platform in which the user may post digital story compositions, (2) determining that a particular time period coincides with a life event of the user, (3) maintaining, during the time period, an additional story channel for the life event in which the user and the user's contacts may post digital story compositions, such that the social networking platform is maintaining both the primary story channel and the additional story channel during the time period, and (4) discontinuing, after the time period, the additional story channel while continuing to maintain the primary story channel. Various other methods, systems, and computer-readable media are also disclosed.

20 Claims, 8 Drawing Sheets

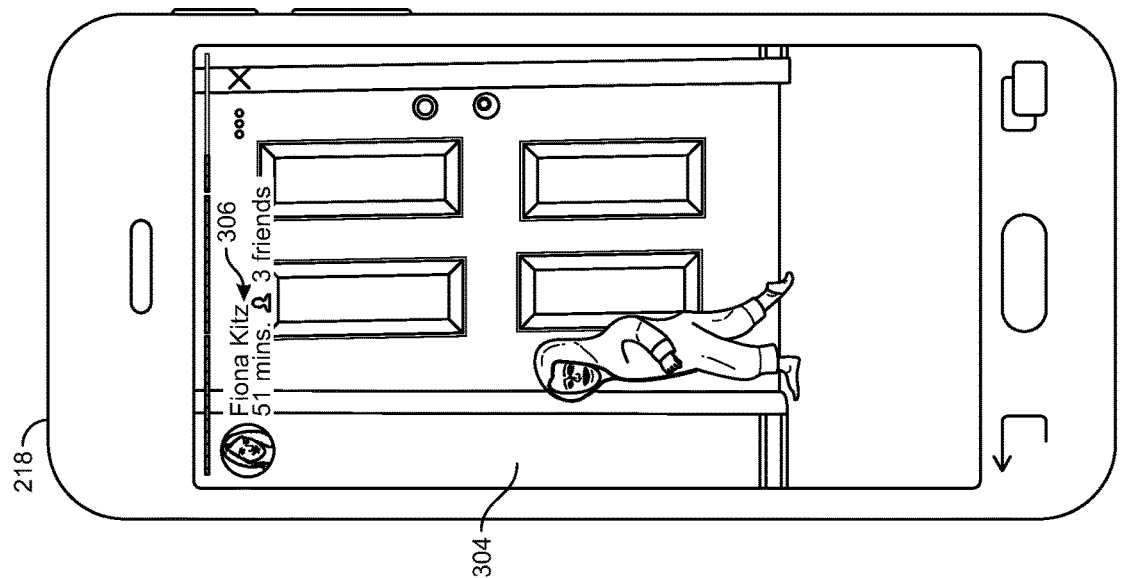
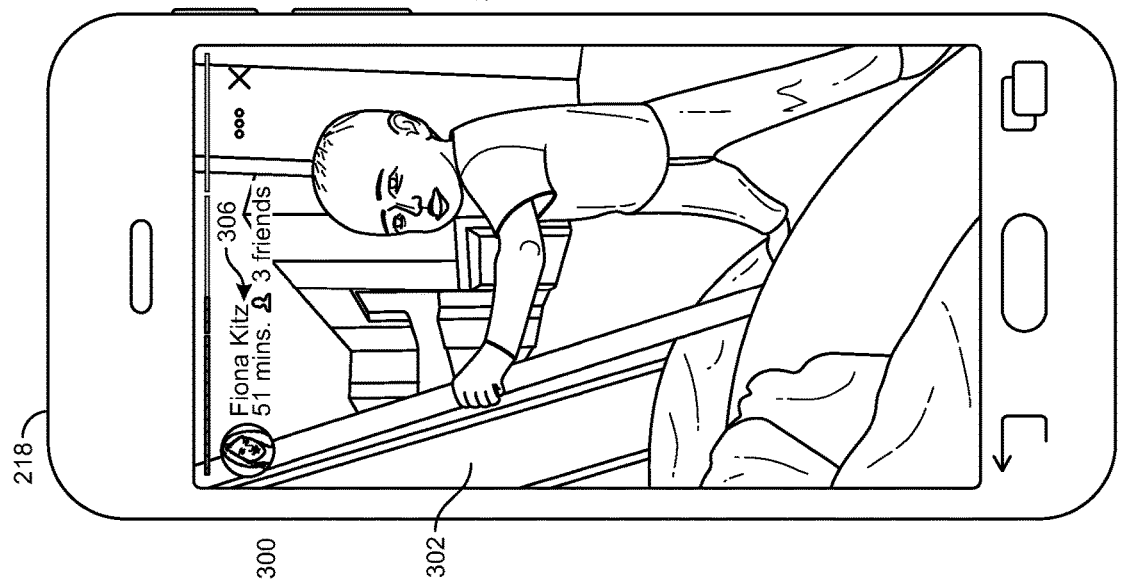
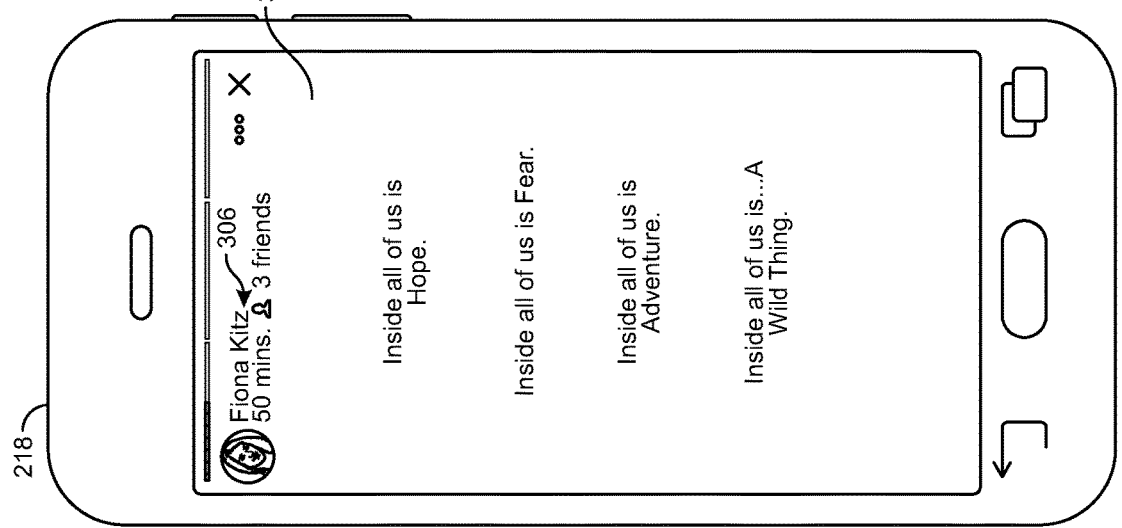
FIG. 3C
FIG. 3B
FIG. 3A

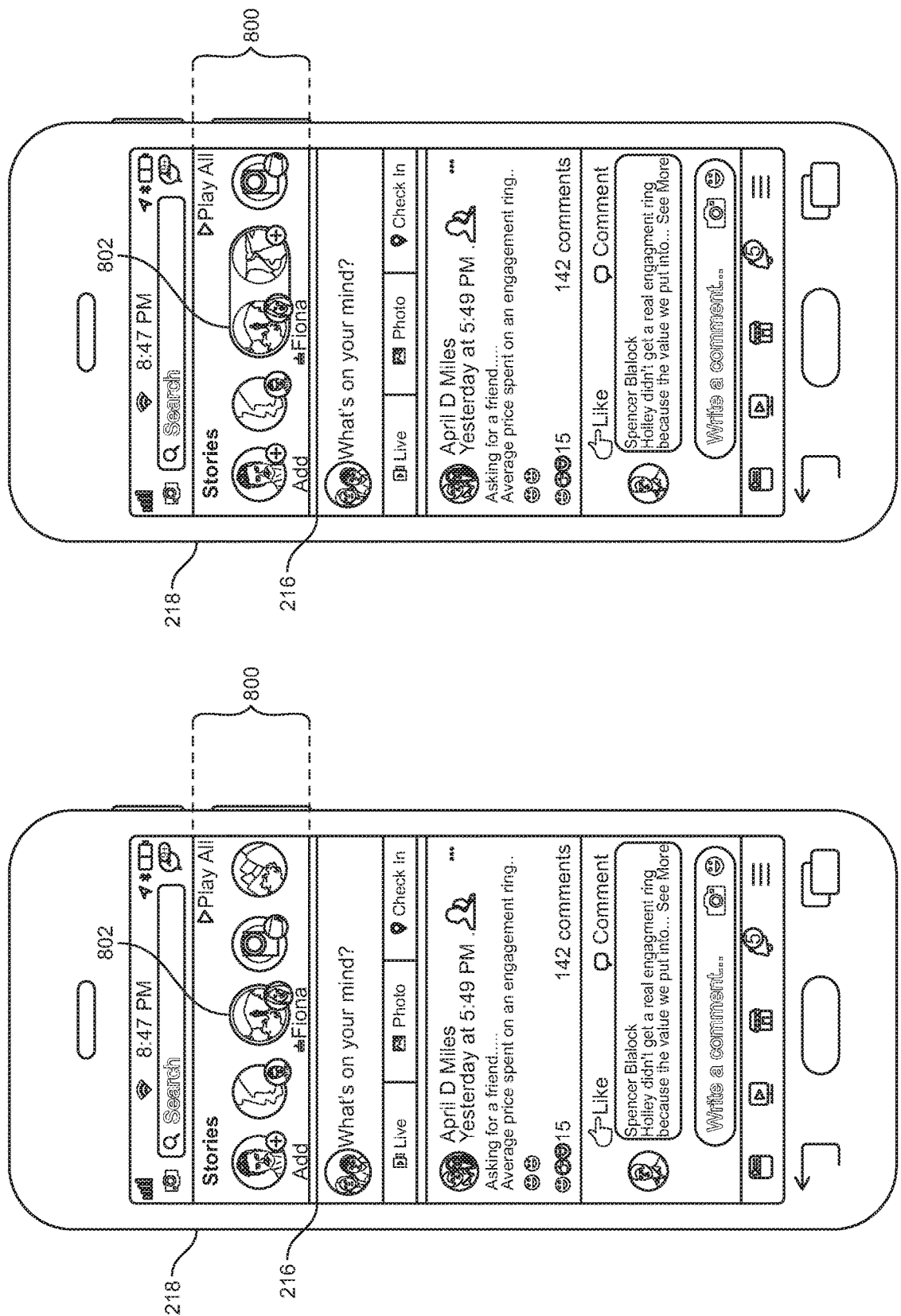

EPHEMERAL DIGITAL STORY CHANNELS

BACKGROUND

Social media applications allow users all over the world to send one another digital compositions communicating thoughts and ideas on various topics. Often, a user's life event may prompt many of the user's contacts to create digital compositions celebrating or otherwise commenting on the life event. For example, many contacts may be interested in transmitting a celebratory post to a user on the user's birthday. However, the organization of data stored in traditional social media systems may be cumbersome and/or difficult to efficiently organize when a high number of digital compositions are created in response to a life event. The instant disclosure therefore identifies a need for improved systems and methods for digitally organizing and displaying social media compositions that relate to life events.

SUMMARY

As will be described in greater detail below, the instant disclosure describes various systems and methods for creating and maintaining an ephemeral digital story channel. In one example, a computer-implemented method may include (1) maintaining a primary story channel for a user of a social networking platform in which the user may post digital story compositions, (2) determining that a particular time period coincides with a life event of the user, (3) maintaining, during the time period, an additional story channel for the life event in which the user and the user's contacts may post digital story compositions, such that the social networking platform is maintaining both the primary story channel and the additional story channel during the time period, and (4) discontinuing, after the time period, the additional story channel while continuing to maintain the primary story channel. In one embodiment, maintaining the primary story channel may further include (1) maintaining a container configured to only include digital story compositions created by the user that the user has designated as intended for the primary story channel, and (2) posting the designated digital story compositions to one or more additional users. In this embodiment, each posted designated digital story composition may be designated as belonging to the primary story channel.

In some examples, determining that the time period coincides with the life event may further include (1) identifying the life event in a digital calendar maintained for the user by the social networking platform, and/or (2) identifying information describing the life event in a digital profile maintained for the user by the social networking platform. Additionally or alternatively, determining that the time period coincides with the life event may further include (1) receiving user input selecting the life event and associating the life event with the time period, and/or (2) identifying information describing the life event in a digital composition. In one embodiment, the life event may be a birthday.

In some examples, maintaining the additional story channel may include (1) maintaining an additional container configured to include (i) digital story compositions created by the user that have been designated as intended for the additional story channel, and (ii) digital story compositions created by the user's contacts that have been designated as intended for the additional story channel, and (2) posting the digital story compositions, which were designated by the user or that were designated by the user's contacts, to one or more additional users. In these examples, each posted digital story composition may be designated as belonging to the additional story channel.

In one embodiment, the method may further include (1) during the time period, posting a temporary prompt to add digital story compositions to the additional story channel, and (2) receiving user input to the temporary prompt initiating a story creation process to add digital story compositions to the additional story channel. In some examples, the life event may be an anniversary with an additional user. In these examples, maintaining the additional story channel may further include allowing the additional user's contacts to post digital story compositions to the additional story channel during the time period.

In one embodiment, a system for implementing the above-described method may include a stories module, stored in memory, that (1) maintains a primary story channel for a user of a social networking platform in which the user may post digital story compositions, (2) determines that a particular time period coincides with a life event of the user, (3) maintains, during the time period, an additional story channel for the life event in which the user and the user's contacts may post digital story compositions, such that the social networking platform maintains both the primary story channel and the additional story channel during the time period, and (4) after the time period, discontinues the additional story channel while continuing to maintain the primary story channel. In this embodiment, the system may also include a physical processor configured to execute the stories module.

In some examples, the above-described method may be encoded as computer-readable instructions on a non-transitory computer-readable medium. For example, a computer-readable medium may include one or more computer-readable instructions that, when executed by at least one processor of a computing device, may cause the computing device to (1) maintain a primary story channel for a user of a social networking platform in which the user may post digital story compositions, (2) determine that a particular time period coincides with a life event of the user, (3) maintain, during the time period, an additional story channel for the life event in which the user and the user's contacts may post digital story compositions, such that the social networking platform is maintaining both the primary story channel and the additional story channel during the time period, and (4) discontinue, after the time period expires, the additional story channel while continuing to maintain the primary story channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 3A-3C are illustrations of digital story compositions within an exemplary primary story channel, being displayed via a consumption interface.

FIGS. 8A-8B illustrate an expandable tile within an exemplary stories summary ribbon displayed within an exemplary composition interface.

Figure 1:
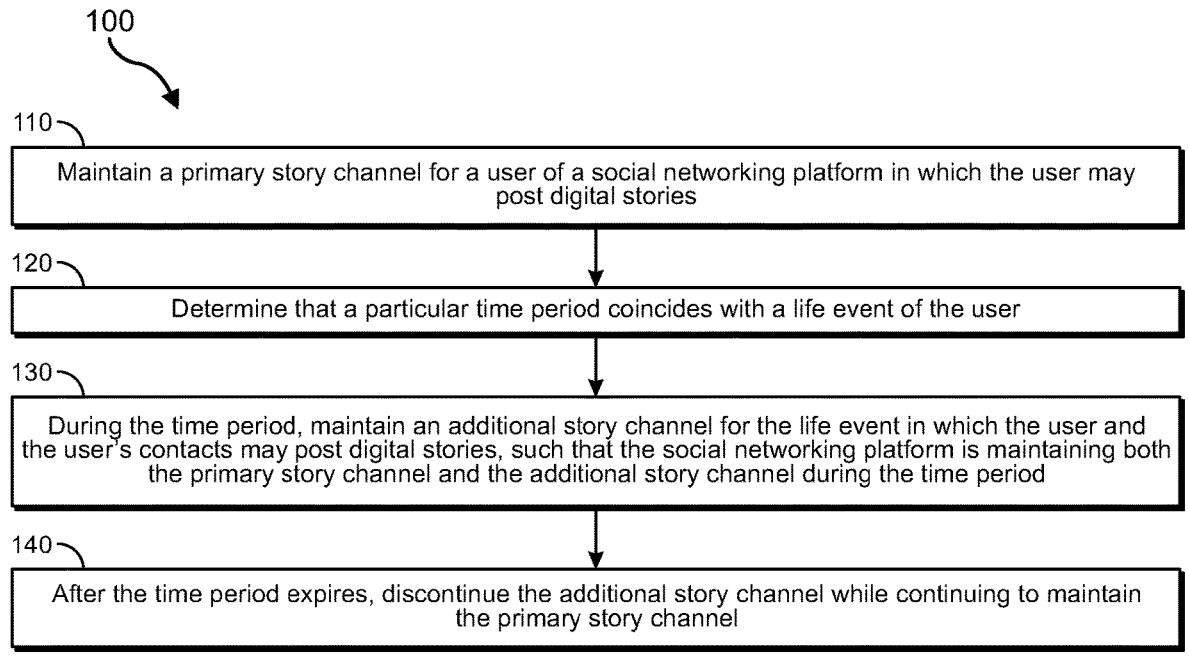
FIG. 1 is a flow diagram of an exemplary method for creating and maintaining temporary digital story channels for celebratory events.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an ephemeral celebratory story channel. This celebratory story channel may be automatically generated for a member of a social networking platform based on data, indicative of a life event for the member, that is maintained by the social networking platform. As an example, a birthday story channel may be automatically created for a member on a particular date based on birthday information, maintained by a social networking platform, indicating that the particular date is the user's birthday. The member for whom the celebratory story channel is created (the "celebrated member") may control who is permitted to contribute to the celebratory story channel. Additionally, the celebrated member may control who is permitted to view the celebratory story channel (e.g., anyone, only friends, or only the member).

Contributors may add to the celebratory story from multiple different entry points, such as a cover card of the celebratory story, a cover card of the celebrated member, and/or a landing screen tile of the celebrated member. The celebratory story channel may remain live for a limited time (e.g., 24 hours), after which contributors will no longer be permitted to contribute to the celebratory story channel, and the stories will no longer be viewable (except to the celebrated member). In some examples, after the limited time expires, the social networking platform may create a private digital video of the celebratory story channel for the celebrated member to view and/or digitally share with others. This video may be stored in a container dedicated to the celebrated member's primary story channel.

As will be explained in greater detail below, embodiments of the instant disclosure may provide an easier method for organizing data (e.g., included in digital compositions) that relate to a life event. This may improve the functioning of a computer itself by increasing the computer's ability to meaningfully organize data.

The following will provide, with reference to FIG. 1, detailed descriptions of computer-implemented methods for creating and maintaining ephemeral digital story channels for celebratory events. Detailed descriptions of corresponding example systems will also be provided in connection with FIG. 2. In addition, detailed descriptions of a corresponding reply system creation flow will be provided in connection with FIGS. 3-8.

FIG. 1 is a flow diagram of an exemplary computer-implemented method 100 for creating and maintaining ephemeral digital story channels for celebratory events. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 (e.g., as shown in exemplary system 200 in FIG. 2).

As illustrated in FIG. 1, at step 110, one or more of the systems described herein may maintain a primary story channel for a user of a social networking platform in which the user may post digital story compositions. For example, as illustrated in FIG. 2, a stories module 204 may maintain a primary story channel 206 for a user 208 who has an account with a social media platform that manages server 202.

Server 202 generally represents any type or form of backend computing device that performs one or more social networking functions as part of a social networking platform. In certain embodiments, server 202 may include one or more portions of exemplary system 200 in FIG. 2. Although illustrated as a single entity in FIG. 2, server 202 may include and/or represent a group of multiple servers that operate in conjunction with one another.

In some examples, server 202 may maintain various interfaces to be displayed to users of the social networking platform via instances of a social networking application installed on the users' devices. In one example, these interfaces may include one or more composition interfaces and/or one or more consumption interfaces. The composition interfaces may allow users to create digital social media compositions to share with other users of the social media platform. The consumption interfaces may allow users to view the user compositions created by other users.

Figure 2:
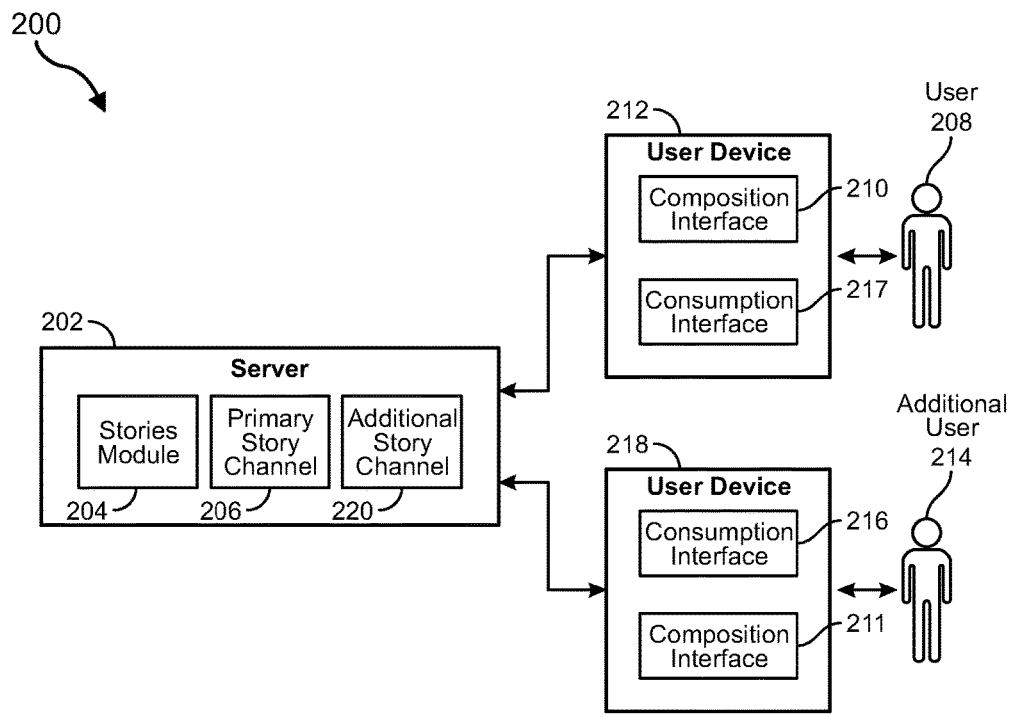
FIG. 2 is a block diagram of an exemplary system for creating and maintaining temporary digital story channels for celebratory events.
Figures 4A, 4B:
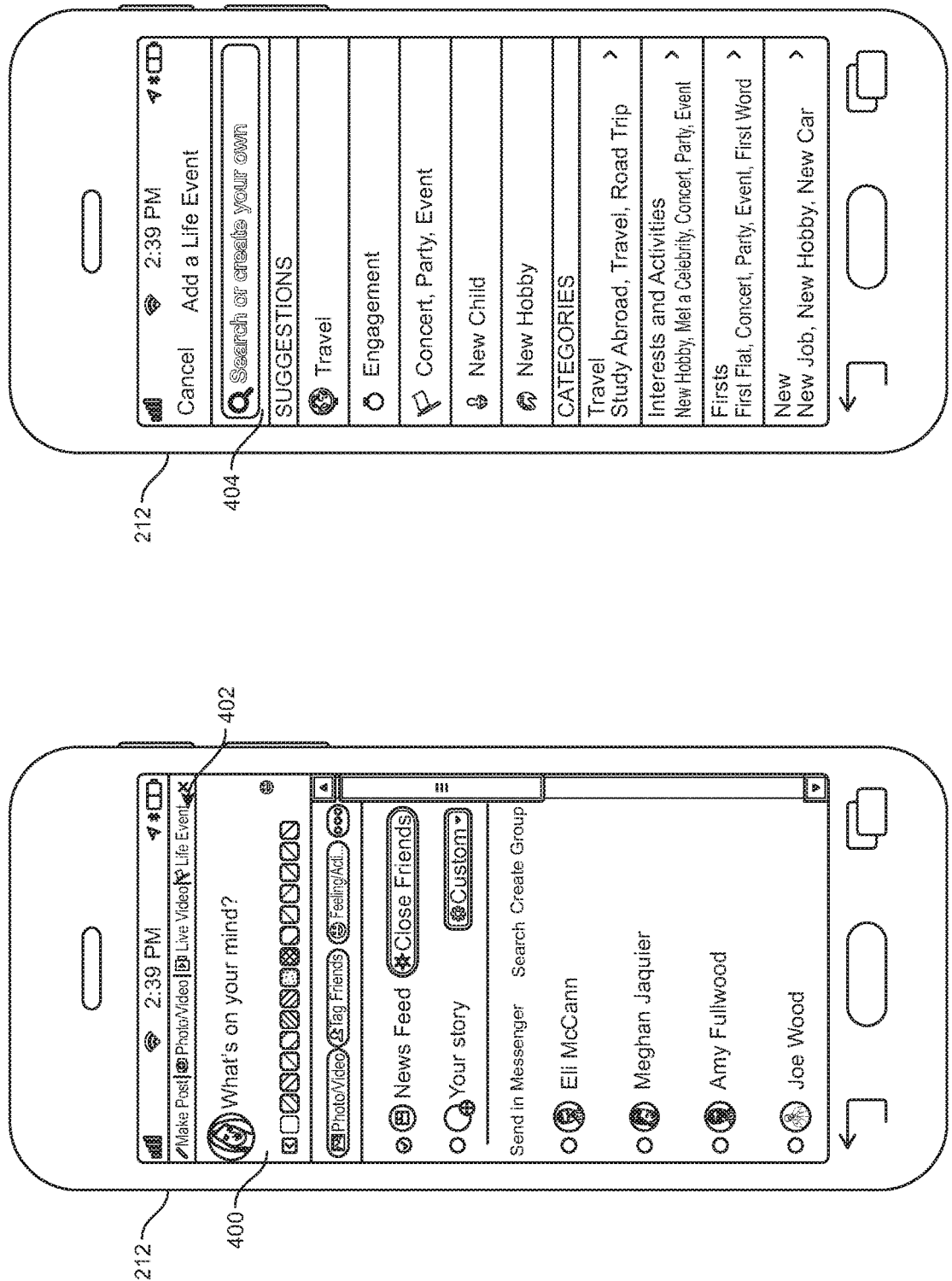
FIGS. 4A-4B illustrate an exemplary creation flow for creating a digital composition based on a life event.
Figure 5B:
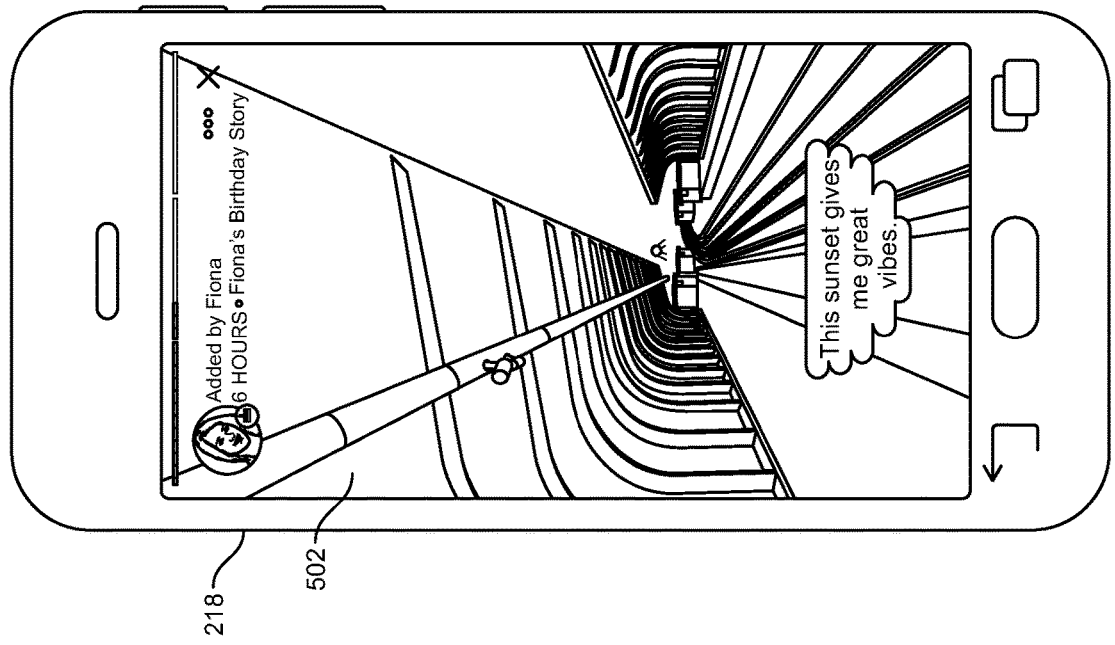
FIGS. 5A-5D are illustrations of digital story compositions within an exemplary additional (temporary) story channel, being displayed via a consumption interface.
Figure 5A:
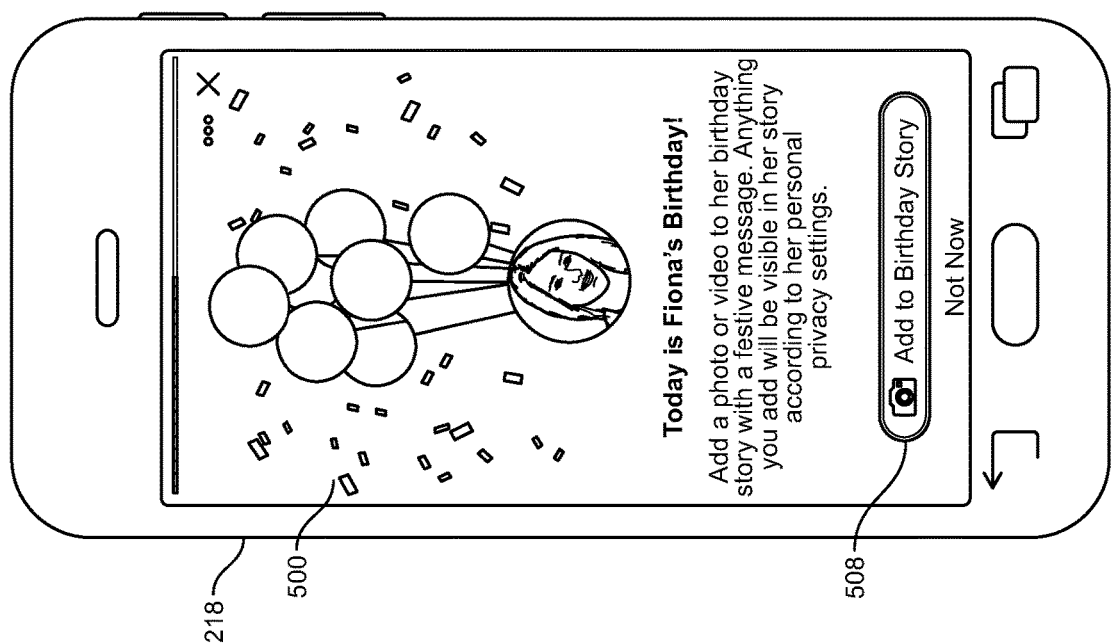
Figure 5D:
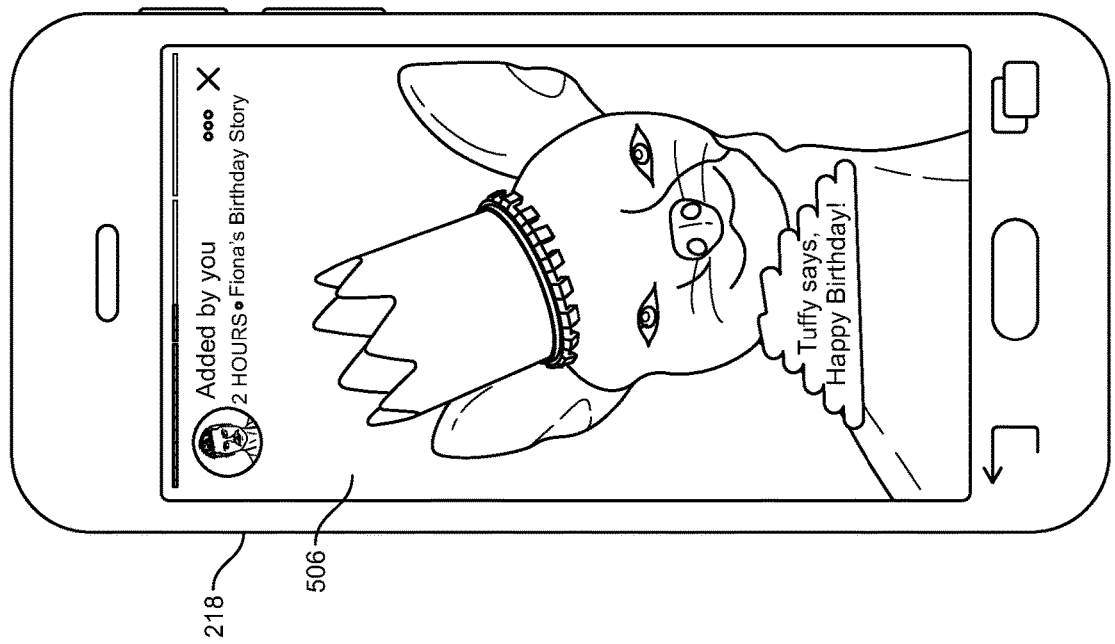
Figure 5C:
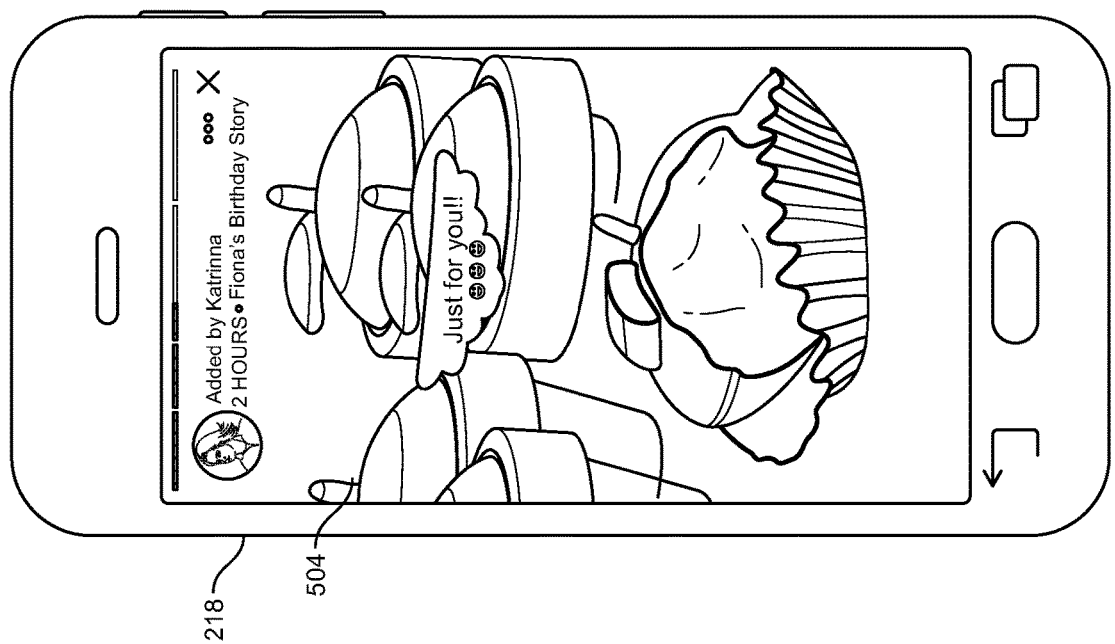
Figure 6:
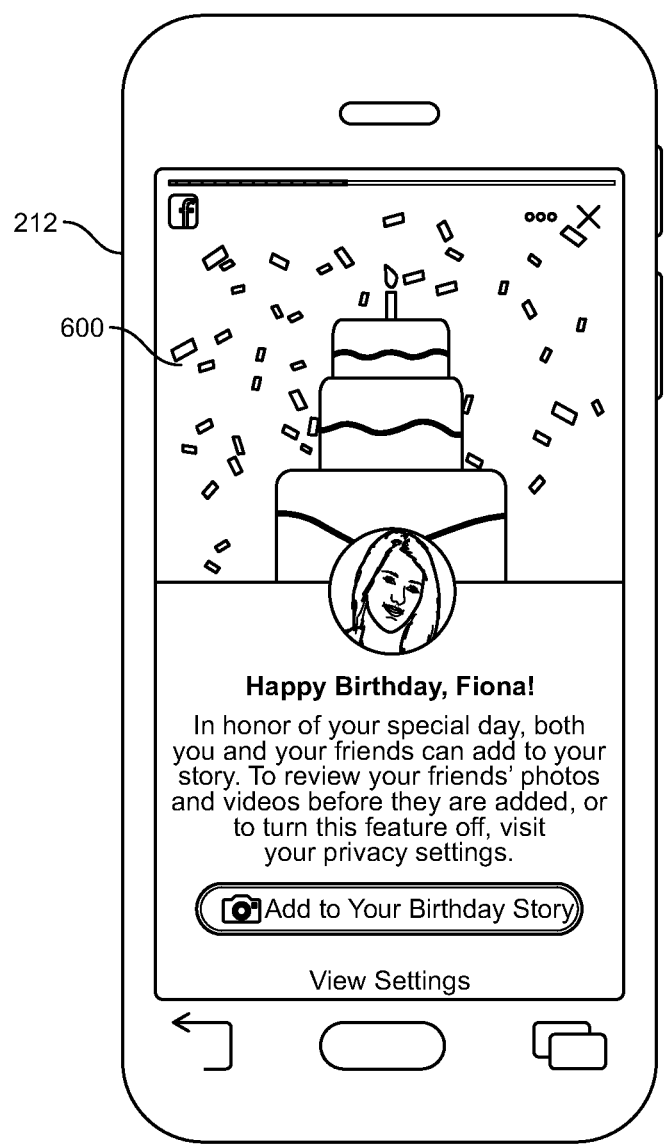
FIG. 6 is an illustration of an exemplary cover card within an exemplary additional (temporary) story channel.

Using FIG. 2 as a specific example, a composition interface 210 may be presented to user 208 via a display element of user device 212. This may allow the user to create digital compositions that may be presented to one or more additional users (e.g., contacts of user 208) via consumption interfaces presented to the additional users. For example, the digital compositions created by user 208 via composition interface 210 may be presented to an additional user 214 via a consumption interface 216 displayed via a display element of an additional user device 218 being used by additional user 214.

Similarly, a composition interface 211 may be displayed to additional user 214 (via the display element of additional user device 218) that may allow additional user 214 to create digital compositions that may be presented to other users. For example, the digital compositions created by additional user 214 may be presented to user 208 via a consumption interface 217 displayed via the display element of user device 212.

In some examples, a consumption interface may include a composition prompt (e.g., with text such as "What's on your mind?" or an addition glyph) that, when selected, navigates to a composition interface. For example, consumption interface 217 may include a composition prompt. When the composition prompt is selected, composition interface 210 may automatically be presented in response via the display element of user device 212.

In one example, (1) composition interfaces 210 and 211 may enable users to create digital story compositions and (2) consumption interfaces 216 and 217 may represent story-consumption interfaces. In this example, consumption interfaces 216 and 217 may present a continuous series of digital story compositions, one by one. In one such example, consumption interfaces 216 and 217 may transition from presenting one digital story composition to the next automatically, without requiring any user input to do so (e.g., in a slideshow format). In some examples, the digital story compositions may be ephemeral. That is, each digital story composition may only be viewable via a consumption interface for a predetermined amount of time, after which the digital story composition will expire. For example, a digital story composition may be set to disappear after twenty-four hours.

The term "digital story composition" as used herein generally refers to any type or form of digital social media composition intended for a stories consumption channel (e.g., to be displayed via a story-consumption interface). A digital story may include a variety of content (e.g., a digital photograph, a digital video, a gif, text, a link, etc.).

In one example, multiple digital story compositions may relate to the same theme, idea, and/or event. In one such example, a first digital story composition, within a group of related digital story compositions, may take the form of a text-based cover card. For example, a group of digital story compositions may each relate to a family Thanksgiving. In this example, a text-based cover card might include the text "We had a wonderful Thanksgiving!" This text-based cover card may be followed by a first digital story composition with a digital photograph of a family gathering around a meal, followed by a second digital story composition with a digital photograph of an assortment of pies, followed by a third digital story composition with a gif of a cartoon turkey.

In some examples, stories module 204 may maintain a primary story channel for users who have a social networking account with the social networking platform. As a specific example, as illustrated in FIG. 2, stories module 204 may maintain primary story channel 206 for user 208. A primary story channel may be created for a user by default (e.g., when the user registers for an account with the social networking platform) or in response to receiving user input from the user affirmatively initiating the creation of the primary story channel.

As used herein, the term "primary story channel" generally refers to a fixed channel for a particular user that is dedicated to digital story compositions that are (1) created by the particular user (e.g., created via an account of the particular user) and (2) designated by the particular user (e.g., designated via the particular user's account) as intended for the primary story channel. The primary story channel may be constantly maintained for the particular user as long as the user's account is active.

Stories module 204 may maintain primary story channel 206 for user 208 in a variety of ways. For example, stories module 204 may (1) create, maintain, and present user interfaces (such as composition interface 210) that collect, from user 208, digital story compositions that have been designated as intended for primary story channel 206, (2) create and maintain a container in which the collected digital story compositions may be stored, and (3) post the collected digital story compositions (for a limited duration) to additional users (e.g., via consumption interfaces such as consumption interface 216). These posted digital story compositions may be designated as belonging to primary story channel 206 (e.g., via a caption with the name of user 208).

User 208 may designate a digital story composition that he or she has created as intended for primary story channel 206 in a variety of ways. In some examples, the designation may be a default designation. That is, a digital story composition created by user 208 may automatically be designated as intended for primary story channel 206. In other examples, user 208 may be provided with a variety of different channel options to which he or she may post a digital story composition. In these examples, user 208 may submit user input affirmatively selecting to post a digital story composition to primary story channel 206.

FIG. 3 provides an exemplary illustration of digital stories, belonging to primary story channel 206, being presented to additional user 214 via consumption interface 216 of additional user device 218. As shown in FIG. 3, primary story channel 206 may include, at a given moment in time, various digital story compositions being broadcast to other users: (1) a first story composition 300 (in this example, a cover card with text), (2) a second story composition 302 (in this example, a boy holding the pole of a tent), and (3) a third story composition 304 (in this example, a boy standing in front of a door). As shown in FIG. 3, each of the stories may indicate the user's name (see, e.g., caption 306 in third story composition 304), associating the story with primary story channel 206, which may coincide with the user's identity.

As indicated above, digital stories within primary story channel 206 may be posted via the consumption interfaces of other users (e.g., contacts of user 208 and/or users who subscribe to primary story channel 206) for a limited duration (e.g., 24 hours). That is, the digital stories may be ephemeral. Thereafter, the digital stories may, in some examples, remain in a container of primary story channel 206, which may be accessible to user 208 but inaccessible to other users.

Returning to FIG. 1, at step 120, one or more of the systems described herein may determine that a particular time period coincides with a life event of the user. For example, as illustrated in FIG. 2, stories module 204 may determine that a particular time period coincides with a life event of user 208.

Stories module 204 may identify a variety of types of life events, including, without limitation, a birthday, a wedding anniversary, the purchase of a new home, a graduation, etc. Stories module 204 may determine that a time period coincides with a life event in a variety of ways. In some embodiments, stories module 204 may obtain this information from a digital profile and/or a digital calendar maintained for user 208 by the social networking platform. For example, stories module 204 may determine that October 24$^{th}$ is the user's birthday based on information in the user's digital calendar and/or the user's digital profile. In this example, the social networking platform may have originally received this information via a registration interface presented to user 208 during a registration process for creating an account with the social networking platform.

In other embodiments, stories module 204 may receive user input selecting the life event and associating the life event with the time period. For example, stories module 204 may receive user input from user 208 indicating that the user was married on a particular day and/or purchased a new car on a particular day. In one such embodiment, user 208 may submit this information as part of a creation process to create a social media composition, such as a newsfeed post and/or a digital story, announcing a life event. For example, a composition interface may include a user selectable element that allows the user to select a life event (e.g., in order to create a composition that digitally announces the life event). Using FIGS. 4A-4B as a specific example, a composition interface 400 (in FIG. 4A) may include a selectable element 402 which (when selected) may navigate user 208 to an additional composition interface (such as additional composition interface 404 in FIG. 4B) from which user 208 may select the life event and a particular date on which the life event is occurring.

In other embodiments, stories module 204 may identify information describing the life event from text within a digital composition created by user 208 and/or directed at user 208. In these embodiments, stories module 204 may run a natural language analysis on the text to identify the life event. For example, stories module 204 may identify text indicative of a life event in a digital composition posted to a newsfeed and/or stories channel of user 208 that was posted by user 208 and/or by a contact of user 208. The term "newsfeed" as used herein generally refers to a consumption channel that presents a scrollable collection of newsfeed compositions created by a particular user's contacts. The term "newsfeed composition" as used herein generally refers to any type or form of composition that may be displayed in a newsfeed consumption channel. Newsfeed compositions may include, without limitation, text-based compositions, media-based compositions (which may include either a single media item or a collage of multiple media items), and/or a link to an online article.

As a specific example of stories module 204 identifying a life event from a newsfeed composition, stories module 204 may identify a newsfeed composition posted by user 208 to his or her newsfeed that includes the text "Just bought my new car!" Then, in this example, stories module 204 may deduce that user 208 purchased a new car on the day the newsfeed composition was posted based on an analysis of the text included in the newsfeed composition. As another specific example, stories module 204 may identify a newsfeed composition posted by additional user 214 to a newsfeed and/or stories channel of user 208 that includes the text "So glad these two were married today!" Then, in this specific example, stories module 204 may deduce that user 208 was married on the day the newsfeed post was posted by additional user 214 based on an analysis of the text included in the newsfeed composition posted by additional user 214.

Returning to FIG. 1, at step 130, one or more of the systems described herein may, during the time period, maintain an additional story channel for the life event in which the user and the user's contacts may post digital stories, such that the social networking platform is maintaining both the primary story channel and the additional story channel during the time period. For example, as illustrated in FIG. 2, stories module 204 may, during the time period identified at step 120, maintain an additional story channel 220 in which both user 208 and one or contacts of user 208 (e.g., additional user 214) may post digital story compositions.

The phrase "contacts of user 208" as used herein, generally refers to other users that are associated with user 208 within the social networking platform. In some examples, the term "contacts" may refer to users whom user 208 has designated as connected to him or her (e.g., with a designator such as "friend," "acquaintance," etc.). In other examples, the term "contacts" may refer to fellow members of the same social networking platform to which user 208 is a member.

Stories module 204 may maintain additional story channel 220 in a variety of ways. For example, stories module 204 may create and maintain a container configured to include digital story compositions designated as intended for additional story channel 220. However, in contrast to the container maintained for primary story channel 206, the container for additional story channel 220 may include digital story compositions created by one or more contacts of user 208 in addition to including digital story compositions created by user 208.

In this example, user 208 may create digital story compositions for additional story channel 220 via his or her account with the social networking platform and add the digital story compositions using his or her account. The contacts may create digital story compositions for additional story channel 220 via their accounts and may add their digital story compositions using their accounts. Then, when stories module 204 receives digital story compositions that have been designated as belonging to additional story channel 220, stories module 204 may post the received digital story compositions (e.g., via consumption interfaces such as consumption interface 216). These posted digital story compositions may be designated as belonging to additional story channel 220 (e.g., by including a designator in a caption). This designator may include the name of user 208 and a description of the life event. As a specific example, if user 208's name is "Fiona" and additional story channel 220 is created for her birthday, each digital story composition may include the designator "Fiona's Birthday!"

In some examples, user 208 may control which contacts have permission to view the compositions within additional story channel 220. Additionally or alternatively, user 208 may control which contacts have permission to add compositions to additional story channel 220. In one such example, user 208 may receive a notification alerting him or her that additional story channel 220 has been created and prompting the user to select a privacy setting controlling who may view and/or contribute to additional story channel 220.

FIGS. 5A-5D depict an exemplary embodiment of additional story channel 220 in which additional story channel 220 represents a celebratory birthday channel for user 208 (named, in this example, "Fiona"). The depiction of additional story channel 220 in FIGS. 5A-5D includes a series of celebratory digital story compositions: (1) an inaugural cover story 500, automatically generated by the social media platform, (2) a story 502 created by Fiona, (3) a story 504 created by a contact of Fiona's named Katrinna, and (4) a story 506 created by one of Fiona's contacts (i.e., additional user 214) to whom additional story channel 220 is being presented (i.e., via consumption interface 216).

In some examples, a configuration of an inaugural cover story presented via additional story channel 220 may differ depending on whose account is being used to view additional story channel 220. For example, if additional story channel 220 is being presented to a contact of the user being celebrated, an inaugural cover story such as inaugural cover story 500 in FIG. 5A may be presented. If, by contrast, additional story channel 220 is being presented to the user who is being celebrated, a modified inaugural cover story may be presented, such as inaugural cover story 600 illustrated in FIG. 6.

In some examples, stories module 204 may receive celebratory digital story compositions for additional story channel 220 in response to receiving input to a prompt soliciting such compositions. This prompt may represent a temporary prompt that is only presented during the time period in which additional story channel 220 is being maintained (e.g., until additional story channel 220 expires). In some embodiments, the prompt may be presented to user 208. Additionally or alternatively, the prompt may be presented to contacts of user 208. The prompt may include a selectable element that triggers a composition creation process. In response to receiving user input selecting the selectable element, stories module 204 may present a composition interface. A digital composition created via the presented composition interface may automatically be posted as belonging to additional story channel 220.

Stories module 204 may present a variety of different types of prompts soliciting compositions for additional story channel 220. In some examples, a cover card to additional story channel 220 may include a prompt to add the digital composition to additional story channel 220. Using FIG. 5A as a specific example, inaugural cover story 500 may include a prompt 508 with a selectable element that includes the text "Add to Birthday Story." Additionally or alternatively, a digital story composition with a prompt (e.g., that includes the same features as inaugural cover story 500) may be included within primary story channel 206 as an intermediate or terminal story.

Figure 7:
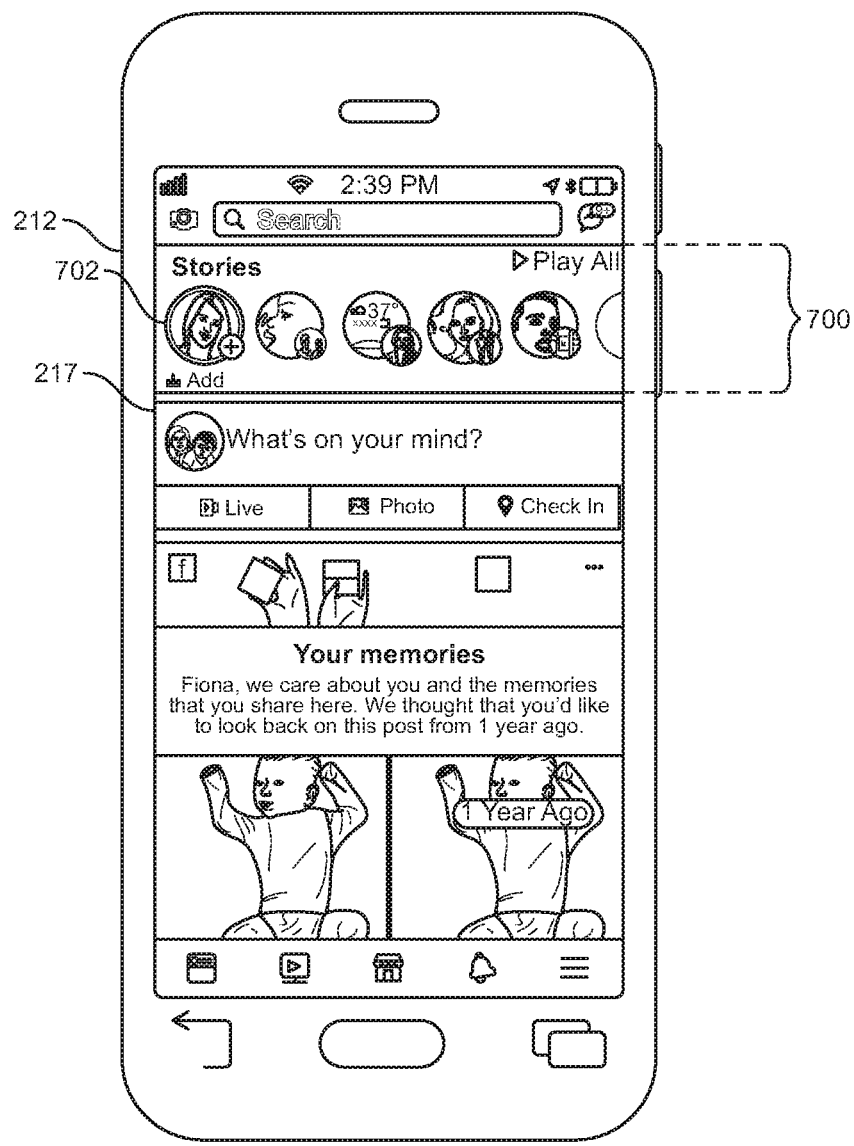
FIG. 7 is an illustration of an exemplary composition interface with a stories summary ribbon that includes a modified tile signifying the existence of an additional (temporary) story channel.

In other examples, a prompt to create a celebratory digital story composition may be presented within a stories summary ribbon being presented to user 208. For example, as illustrated in FIG. 7, consumption interface 217 may include a stories summary ribbon 700 that includes a row of tiles (circular tiles in FIG. 7). Each tile may correspond to a different user's primary story channel and may be selected to view its corresponding primary story channel. Thus, by selecting a tile associated with a given user, user 208 may view digital story compositions of that user. In some examples, stories module 204 may temporarily (e.g., for 24 hours) alter the appearance of the tile corresponding to user 208 while additional story channel 220 is being maintained. For example, as depicted in FIG. 7, while a celebratory birthday channel is being maintained for user 208, a tile 702 for user 208 may be encompassed by a double circle and may be affixed with an icon of a birthday cake.

This change may additionally or alternatively be presented within the stories summary ribbons of one or more contacts of user 208. For example, as illustrated in FIG. 8A, consumption interface 216 (being presented to additional user 214) may include a stories summary ribbon 800 that includes a tile 802 for user 208 that may change appearances when a celebratory birthday channel is being maintained for user 208.

In some examples, a tile for a user for whom an additional story channel is currently being maintained may, when selected via user input, expand to reveal two tiles: one corresponding to that user's primary story channel and another corresponding to the additional story channel. For example, as illustrated in FIG. 8B, the space corresponding to tile 802 may expand to reveal a first tile corresponding to primary story channel 206 (that is, tile 802) and a second tile (i.e., a new tile) corresponding to additional story channel 220. In this example, additional user 214 may (1) select the first tile to view the digital story compositions within primary story channel 206 that are currently being broadcast and/or (2) select the second tile to (i) view the digital story compositions within additional story channel 220 and/or (ii) initiate the creation of a digital story composition to add to additional story channel 220.

Finally, returning to FIG. 1, at step 140, one or more of the systems described herein may, after the time period expires, discontinue the additional story channel (while continuing to maintain the primary story channel). Using FIG. 2 as a specific example, stories module 204 may, after the time period identified at step 120 expires, discontinue additional story channel 220. That is, stories module 204 may remove additional story channel 220 from consumption such that other users may no longer be able to view or add to additional story channel 220.

After the time period expires, stories module 204 may continue to maintain the contents of additional story channel 220 (e.g., in a designated container) such that user 208 may continue to access the contents. In some examples, stories module 204 may create a digital video with the contents (that is, with the digital story compositions that were posted to additional story channel 220). In these examples, stories module 204 may transmit the video to user 208 and/or allow user 208 to post the video on the social networking platform and/or otherwise transmit the video to others (e.g., via email).

In some examples, a life event (such as an anniversary) may impact multiple users. In these examples, an additional story channel may be maintained that includes all of the impacted users as the celebrated users. To provide a specific example, additional story channel 220 may represent an anniversary of a marriage between user 208 and additional user 214. In this example, both users may be able to control the privacy settings of additional story channel 220, the contacts of both users may be permitted to view and/or add to additional story channel 220, and both users may be able to view the contents of additional story channel 220 after additional story channel 220 expires.

As described throughout the instant disclosure, the disclosed systems and methods may provide systems and methods for creating celebratory story channels that are available (i.e., to be viewed or added to) only during a limited time corresponding to a celebratory event, such as a birthday or anniversary. In some examples, a user for whom the celebratory story channel is created may select a privacy setting that allows other users to add to the celebratory story channel. This may differ from a primary story channel maintained for the user to which only the user is permitted to add content. Thus, the primary story channel may represent a permanent channel with ephemeral content (that is, content that is viewable for only limited time after which the content expires) added by a single user. And, the celebratory story channel may represent an ephemeral channel with ephemeral content added by the single user and by contacts of the single user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into a digital story composition (e.g., intended for an ephemeral story channel). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    maintaining a primary story channel for a user of a social networking platform in which the user may post digital story compositions;
    determining that a particular time period coincides with a life event of the user;
    during the time period, maintaining an additional story channel for the life event in which the user and the user's contacts may post digital story compositions, such that the social networking platform is maintaining both the primary story channel and the additional story channel during the time period; and
    after the time period expires, discontinuing the additional story channel while continuing to maintain the primary story channel.

2. The computer-implemented method of claim 1, wherein maintaining the primary story channel comprises:
    maintaining a container configured to only include digital story compositions created by the user that the user has designated as intended for the primary story channel; and
    posting the designated digital story compositions to one or more additional users, wherein each posted designated digital story composition is designated as belonging to the primary story channel.

3. The computer-implemented method of claim 1, wherein determining that the time period coincides with the life event comprises at least one of:
    identifying the life event in a digital calendar maintained for the user by the social networking platform; or
    identifying information describing the life event in a digital profile maintained for the user by the social networking platform.

4. The computer-implemented method of claim 1, wherein determining that the time period coincides with the life event comprises at least one of:
    receiving user input selecting the life event and associating the life event with the time period; or
    identifying information describing the life event in a digital composition.

5. The computer-implemented method of claim 1, wherein the life event comprises a birthday.

6. The computer-implemented method of claim 1, wherein maintaining the additional story channel comprises:
    maintaining an additional container configured to include:
        digital story compositions created by the user that have been designated as intended for the additional story channel; and digital story compositions created by the user's contacts that have been designated as intended for the additional story channel; and posting the digital story compositions, which were designated by the user or that were designated by the user's contacts, to one or more additional users, wherein each posted digital story composition is designated as belonging to the additional story channel.

7. The computer-implemented method of claim 1, further comprising:

during the time period, posting a temporary prompt to add digital story compositions to the additional story channel; and receiving user input to the temporary prompt initiating a story creation process to add a digital story composition to the additional story channel.

8. The computer-implemented method of claim 1, wherein:

the life event comprises an anniversary with an additional user; and maintaining the additional story channel comprises further allowing the additional user's contacts to post digital story compositions to the additional story channel during the time period.

9. A system comprising:

a stories module, stored in memory, that:
  maintains a primary story channel for a user of a social networking platform in which the user may post digital story compositions;
  determines that a particular time period coincides with a life event of the user;
  during the time period, maintains an additional story channel for the life event in which the user and the user's contacts may post digital story compositions, such that the social networking platform maintains both the primary story channel and the additional story channel during the time period; and
  after the time period, discontinues the additional story channel while continuing to maintain the primary story channel; and at least one physical processor configured to execute the stories module.

10. The system of claim 9, wherein the stories module maintains the primary story channel by:

maintaining a container configured to only include digital story compositions created by the user that the user has designated as intended for the primary story channel; and posting the designated digital story compositions to one or more additional users, wherein each posted designated digital story composition is designated as belonging to the primary story channel.

11. The system of claim 9, wherein the stories module determines that the time period coincides with the life event by at least one of:

identifying the life event in a digital calendar maintained for the user by the social networking platform; or identifying information describing the life event in a digital profile maintained for the user by the social networking platform.

12. The system of claim 9, wherein the stories module determines that the time period coincides with the life event by at least one of:

receiving user input selecting the life event and associating the life event with the time period; or identifying information describing the life event in a digital composition.

13. The system of claim 9, wherein the life event comprises a birthday.

14. The system of claim 9, wherein the stories module maintains the additional story channel by:

maintaining an additional container configured to include:
  digital story compositions created by the user that have been designated as intended for the additional story channel; and
  digital story compositions created by the user's contacts that have been designated as intended for the additional story channel; and posting the digital story compositions, which were designated by the user or that were designated by the user's contacts, to one or more additional users, wherein each posted digital story composition is designated as belonging to the additional story channel.

15. The system of claim 9, wherein the stories module further:

posts, during the time period, a temporary prompt to add digital story compositions to the additional story channel; and receives user input to the temporary prompt initiating a story creation process to add a digital story composition to the additional story channel.

16. The system of claim 9, wherein:

the life event comprises an anniversary with an additional user; and the stories module maintains the additional story channel by further allowing the additional user's contacts to post digital story compositions to the additional story channel during the time period.

17. A non-transitory computer-readable medium comprising one or more computer-readable instructions that, when executed by at least one processor of a computing device, cause the computing device to:

maintain a primary story channel for a user of a social networking platform in which the user may post digital story compositions;

determine that a particular time period coincides with a life event of the user;

during the time period, maintain an additional story channel for the life event in which the user and the user's contacts may post digital story compositions, such that the social networking platform is maintaining both the primary story channel and the additional story channel during the time period; and after the time period expires, discontinue the additional story channel while continuing to maintain the primary story channel.

18. The non-transitory computer-readable medium of claim 17, wherein the computer-readable instructions cause the computing device to maintain the primary story channel by:

maintaining a container configured to only include digital story compositions created by the user that the user has designated as intended for the primary story channel; and posting the designated digital story compositions to one or more additional users; wherein each posted designated digital story composition is designated as belonging to the primary story channel.

19. The non-transitory computer-readable medium of claim 17, wherein the computer-readable instructions cause the computing device to determine that the time period coincides with the life event by at least one of:

identifying the life event in a digital calendar maintained for the user by the social networking platform; or identifying information describing the life event in a digital profile maintained for the user by the social networking platform.

20. The non-transitory computer-readable medium of claim 17, wherein the computer-readable instructions cause the computing device to determine that the time period coincides with the life event by at least one of:
receiving user input selecting the life event and associating the life event with the time period; or
identifying information describing the life event in a digital composition.

\* \* \* \* \*